Patented Mar. 19, 1940

2,194,405

UNITED STATES PATENT OFFICE 2,194,405

PROCESS OF PRODUCING TETRA-ACETALS OF GLYOXAL AND PRODUCTS THEREOF

Clifford B. Purves, Cambridge, Mass., assignor to Research Corporation, New York, N. Y., a corporation of New York No Drawing. Application March 23, 1939, Serial No. 263,809

14 Claims. (Cl. 260—615)

This invention relates to improvements in the art of producing tetracetals of glyoxal, of the general formula

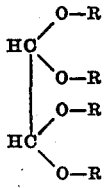

wherein R represents a univalent organic substituent and to the resulting novel products.

The basis of the invention is the reaction between glyoxal sulphate and an alcohol (or equivalent) to the production of a glyoxal tetra-acetal and sulphuric acid, which reaction may be illustrated generally by the following equation:

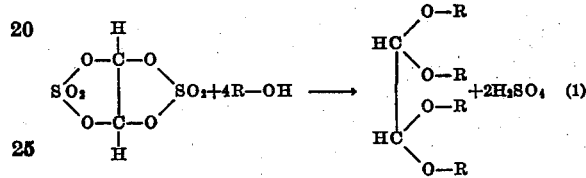

wherein R represents a univalent organic substituent.

When the alcohol employed is ethylene glycol, the reaction takes the following course:

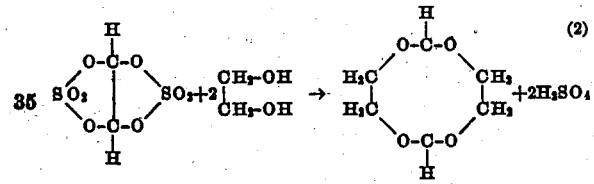

Presumably in accordance with the above reactions, Fischer and Taube (Ber. 58, 1926, page 851) produced glyoxal tetramethyl acetal in an uneconomic yield presumably due to the method for isolating the product. These authors also produced glyoxal tetraethyl acetal in good yield, while Baker and Field (J. Chem. Soc. 90, 1932, p. 86) obtained the tetraethyl acetal and, as well, 2:3 ethylene dioxydioxane (from glycol) both in uneconomic yield.

I have found that glyoxal sulphate, although itself stable at temperatures up to and exceeding 100° C., rapidly produces a dark tar when moistened with an alcohol at a temperature of about 60° C., and that, therefore, the glyoxal sulphate and the alcohol should be at a relatively low temperature when initially brought together incident to the production of a homogeneous mixture. This precaution was observed by Fischer and Taube, who also taught the desirability of working with substantially anhydrous reactants. Fischer and Taube taught to treat the reaction product with cold caustic soda whereby to neutralize the sulphuric acid formed by the reaction.

I have found also that the presence of aqueous mineral acid during the reaction of glyoxal sulphate with alcohol, and, as well, during the isolation of the resulting tetra-acetal, is disadvantageous.

It is an object of the present invention to provide an improved process of producing tetra-acetals of glyoxal. Another object of the invention is to provide new and improved modes of recovering or isolating tetra-acetals of glyoxal in quantitative, or substantially quantitative, amounts.

In accordance with the improved process of the present invention glyoxal sulphate and the alcohol, the latter in an excess over the stoicheometric equivalent, are admixed at a relatively low temperature (e. g., 40° C. or below) and are caused to react in the presence of a relatively water-insoluble solid base such as solid CaO or Ca(OH)$_2$, or equivalent, and/or in the presence of an anhydrous soluble or insoluble salt not of a basic nature, e. g., anhydrous zinc chloride, calcium chloride, zinc acetate, or equivalent, in an amount at least sufficient to combine with the sulphuric acid or derivative thereof formed as a by-product in the reaction between glyoxal sulphate and the alcohol. The purpose of the salt is to replace the sulphuric acid formed in the reaction by an acidic radical of a different type, in accordance with one or more equations such as the following illustrative ones:

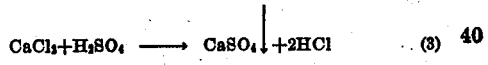

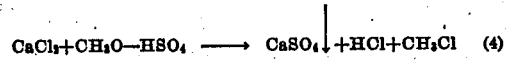

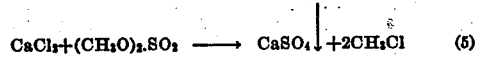

Salts, such as those of calcium, which remove the sulphate radical in insoluble form from the reaction system are valuable in this connection. The advantage of the presence of the salt—e. g., zinc acetate—in the mixture becomes apparent when it is desired to produce the glyoxal tetra-acetals of alcohols of a more complicated molecular structure and liable to undesirable side reactions or rearrangements in the presence of free sulphuric acid or of a sulphuric acid derivative. The salt is employed in a 2 to 1 molar ratio (or, preferably, an excess of a few percent thereover) with respect to the glyoxal sulphate.

When such salts are used, it is, in general, necessary to neutralize the acidity of the crude reaction product (mixture) before proceeding with the isolation of the desired tetra-acetal. However, a material saving in alcohol may be effected by carrying out the reaction (productive of the tetra-acetal) in the presence of solid CaO or equivalent solid base of poor solubility. By this artifice one avoids entirely the consumption of alcohol in production of alkyl sulphate, and hence uses up only about one-half as much alcohol as would be consumed by following the technic disclosed by Fischer and Taube (supra). Moreover, the artifice is important ecenomically because it permits carrying forward the reaction to completion with substantially quantitative yield, whereas it has been found that the reaction does not go forward in economic yield in the presence of dissolved base. When such insoluble basic material has been present in excess during the reaction it is unnecessary to remove acidity from the final mixture.

The reaction between glyoxal sulphate and the anhydrous (or nearly anhydrous) alcohol can be brought to completion by heating the mixture at a temperature not exceeding 100° C. for several hours or by keeping the mixture at a lower temperature for a longer period. If the reaction was not effected in the presence of CaO or equivalent, as above recommended, it is essential to neutralize the reaction mixture before or simultaneously with the admission of water (if water is to be employed during the isolation of the product). While it is possible to neutralize by the addition of an aqueous solution containing an excess of a dissolved alkali (e. g., sodium bicarbonate) it is preferable to employ the solid base (e. g., CaO).

The improved process of the present invention is applicable to a wide range of primary and secondary aliphatic alcohols including those with aromatic or heterocyclic substituents and those with more than one hydroxyl group in the molecule. Illustrative are: methyl, ethyl, iso-propyl, n-amyl, and benzyl alcohols, and glycol. It has been found advantageous,—and especially so in the cases of alcohols containing 4 or more carbon atoms to the molecule,—to bring the alcoholic reactant into admixture with glyoxal sulphate by the use of an indifferent solvent for the alcohol, such, for instance, as an ether or dioxane.

The tetra-acetal products are, in general, water-clear liquids with relatively high boiling points and a mild fragrant odor. Their properties indicate their usefulness in lacquers, paints and like film forming compositions requiring use of medium boiling to high boiling solvents, in solvent extraction processes, in perfumery, and similar fields of usefulness. As the molecular weight of the employed alcohol increases, the boiling point of the resulting tetra-acetal increases and solubility in water decreases. The glycol derivative is solid at room temperature.

By the carrying out of the improved process described above it is possible to produce glyoxal tetra-acetals in general in a quantitative, or nearly quantitative, yield, and when this new information is exploited it is in general possible to isolate the products from the reaction system by processes adapted for each case. In the following are described certain novel isolation procedures, including especially a specific improved procedure for the isolation of glyoxal tetramethyl acetal. This latter is particularly difficult to isolate because its volatility in the excess methyl alcohol is so pronounced that it is practically impossible to remove the alcohol by fractional distillation.

Although glyoxal tetramethyl acetal may be concentrated in the distillate obtained by the fractional distillation of the neutral or alkaline methyl alcoholic reaction system, it can by no means be separated quantitatively from excess methyl alcohol by such methods. It has been found, however, that if the neutral or slightly alkaline reaction mixture be diluted with an equal volume of water and then fractionally distilled, the excess methyl alcohol passes completely as a first fraction into the receiver while the glyoxal tetramethyl acetal remains almost completely in the aqueous residue. An aqueous solution is thus efficiently obtained from a methyl alcoholic solution of the acetal.

It has been found that although glyoxal tetramethyl acetal cannot readily be separated from water by the fractional distillation of its aqueous solution, it is concentrated in the first fractions of the aqueous distillate.

Glyoxal tetramethyl acetal may be removed from neutral or alkaline aqueous solution free from methanol by a prolonged extraction with a low boiling organic solvent, immiscible, or nearly so, with water, e. g., diethyl ether. If the immiscibility is not sufficiently complete, an excessive amount of water will be dissolved along with the tetra-acetal by the organic solvent and the purpose of the separation will be defeated. Thus, when diethyl ether is the extractant, it is necessary to depress the solubility of water in ether by the addition of much sodium chloride before undertaking the extraction.

The process will now be described in greater detail with reference to the following illustrative but non-restrictive examples:

EXAMPLE I.—Glyoxal sulphate was used without special purification. One mol (30.8 g.) thereof was dissolved, in the cold, in 800 c. c. of cold absolute methanol containing two mols (31.4 g.) of anhydrous calcium chloride. After boiling for three hours under a reflux condenser, the solution was set aside for about twelve hours to allow the very finely divided precipitate of calcium sulphate to settle. The decanted mother liquor, together with the methanol washings from the precipitate, was made slightly alkaline with sodium methylate solution and then diluted with an equal volume of water. When this aqueous alcoholic system was fractionally distilled through an efficient column, the methyl alcohol volatilized without carrying over any of the product, which was recovered in the first 750 cc. of the aqueous fraction. Sodium chloride (225 g.) was dissolved in this fraction prior to a 12-hour extraction with ether in an efficient continuous extractor. The ethereal extract was dried over anhydrous magnesium sulphate, the solvent evaporated, and the slightly yellow liquid residue distilled under diminished pressure. The pure acetal boiled at 98–100°/110 mm.

It is to be observed that separation of the finely divided calcium sulphate—which proceeds slowly by gravity settling—may be expedited by running the reaction product mixture through a supercentrifuge. It is to be observed, also, that another agent than the named sodium chloride may, if desired, be employed for depressing the solubility of ether in water: furthermore, that the selected period of time for extraction depends upon the purity desired, the type of extractor employed, and other criteria.

An ether solution of the tetramethyl acetal, when shaken with water, readily loses the tetramethyl acetal to the water. But the reverse is not true; that is to say, an aqueous solution thereof does not readily lose the tetramethyl acetal to ether but must be acted upon by an agent depressing the solubility of water in ether in order that the transfer from aqueous medium to ether medium be satisfactorily effected. This characteristic of the tetramethyl acetal does not appear to be shared by other tetra-acetals of glyoxal. Thus, when a mixture of water and the tetraethyl acetal is shaken and allowed to stand, the tetraethyl acetal and the water separate into two distinct layers.

EXAMPLE II.—*Glyoxal tetra-n-amyl acetal*

8.72 grams of glyoxal sulphate was treated with 75 grams of n-amyl alcohol. The mixture was refluxed at 40–60° C. for about 2 hours. Thereafter the refluxed mixture was neutralized with solid $Na_2CO_3$ and vacuum distilled. At 150° C. and relatively high vacuum (about 2 mm.) about 10 grams of a faintly yellowish liquid came over, which was the tetra-n-amyl-acetal of glyoxal. The tetra-acetal was hydrolyzed to the alcohol and glyoxal, the latter being identified by its color reactions and its formation of a crystalline bishydrazone.

EXAMPLE III.—*Glyoxal tetra-iso-propyl acetal*

8.72 grams of glyoxal sulphate was dissolved in 1 mol of iso-propyl alcohol, and the mixture was refluxed for 2–3 hours. The refluxed mixture was neutralized by treating the same with sodium carbonate solution. The neutralized mixture separated into two layers of which the slightly yellowish supernatant layer contained the isopropyl tetra-acetal: upon hydrolysis it gave isopropyl alcohol and glyoxal, the presence of the latter being confirmed by the color reaction.

In the same general manner it is possible to prepare other tetra-acetals of glyoxal.

I claim:

1. In the process of producing a glyoxal tetraacetal involving reacting glyoxal sulphate with an anhydrous alcohol, the improvement which consists in effecting the reaction in the presence of a compound so sparingly soluble in the reaction medium that it is largely undissolved therein, said compound being capable of reacting with the sulphuric acid produced during the reaction to produce an inorganic sulphate.

2. In the process of producing a glyoxal tetraacetal involving reacting glyoxal sulphate with an anhydrous alcohol, the improvement which consists in effecting the reaction in the presence of a compound capable of reacting with the sulphuric acid produced during the reaction to produce an insoluble sulphate.

3. In the process of producing a glyoxal tetraacetal involving reacting glyoxal sulphate with an anhydrous alcohol, the improvement which consists in effecting the reaction in the presence of a base so sparingly soluble in the reaction medium that it is largely undissolved therein.

4. In the process of producing a glyoxal tetraacetal involving reacting glyoxal sulphate with an anhydrous alcohol, the improvement which consists in effecting the reaction in the presence of lime.

5. In the process of producing a glyoxal tetraacetal involving reacting glyoral sulphate with an anhydrous alcohol, the improvement which consists in effecting the reaction in the presence of a salt of a metal yielding with sulphuric acid an insoluble sulphate.

6. In the process of producing a glyoxal tetraacetal involving reacting glyoxal sulphate with an anhydrous alcohol, the improvement which consists in effecting the reaction in the presence of a calcium salt reactive with sulphuric acid to produce calcium sulphate.

7. In the process of producing a glyoxal tetraacetal involving reacting glyoxal sulphate with an anhydrous alcohol, the improvement which consists in effecting the reaction in the presence of a zinc salt reactive with sulphuric acid to produce zinc sulphate.

8. Process of producing glyoxal tetramethyl acetal which comprises boiling, under reflux, a solution of one mol of glyoxal sulphate and at least two mols of anhydrous calcium chloride in an excess of absolute methanol, neutralizing the acid content of the reaction mixture, adding water, fractionally distilling off the excess methanol, extracting the aqueous residue with ether, and finally distilling off the ether to obtain a residue consisting essentially of the tetramethyl acetal.

9. Process of producing glyoxal tetramethyl acetal which comprises heating a solution of glyoxal sulphate in excess of absolute methanol in the presence of an anhydrous solid base, adding water, fractionally distilling off the excess methanol, extracting the aqueous residue with ether, and finally distilling off the ether to obtain a residue consisting essentially of the tetramethyl acetal.

10. Processes of producing glyoxal tetramethyl acetal which comprises heating a solution of glyoxal sulphate in excess of absolute methanol in the presence of an anhydrous solid base, separating insoluble precipitate from the liquid portion of the resulting reaction mixture, adding water, fractionally distilling off the excess methanol, treating the aqueous residue with a water-soluble salt, extracting the aqueous residue with ether, and finally distilling off the ether to obtain a residue consisting essentially of the tetra-methyl acetal.

11. As new products of glyoxal tetra-acetals of the formula

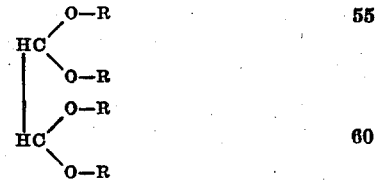

wherein R represents a monovalent organic substituent containing at least 3 carbon atoms.

12. As a new product glyoxal tetra n-amyl acetal.

13. As a new product, a glyoxal tetra-acetal of an alcohol containing a secondary alcoholic group.

14. As a new product glyoxal tetra iso-propyl acetal.

CLIFFORD B. PURVES.